United States Patent [19]
Vesely et al.

[11] 3,750,460
[45] Aug. 7, 1973

[54] THROUGH-FLOW POLAROGRAPHIC ANALYZER HAVING CONSTANT FLOW FACILITIES

[75] Inventors: Miloslav Vesely; Zdenek Bohac; Frantisek Vondrak, all of Pardubice, Czechoslovakia

[73] Assignee: Vyzkumny ustar organickkyck syntez, Pardubice, Czechoslovakia

[22] Filed: Apr. 10, 1972

[21] Appl. No.: 242,379

[30] Foreign Application Priority Data
Apr. 9, 1971 Czechoslovakia.......................... 2543

[52] U.S. Cl........... 73/61.1 R, 204/195 H, 204/219, 204/250
[51] Int. Cl............................................... B01k 3/00
[58] Field of Search.......................... 73/61.1 R, 53; 324/31; 204/195 H, 219, 250

[56] References Cited
UNITED STATES PATENTS
3,210,261 10/1965 Tyler............................... 204/195 H
3,630,876 12/1971 Shibata et al....................... 204/219

*Primary Examiner*—Richard C. Queisser
*Assistant Examiner*—Joseph W. Roskos
*Attorney*—Arthur O. Kline

[57] ABSTRACT

A main measuring path and an auxiliary path individually extend from a common junction at the input of a polarographic analyzer to separate output ports thereof. A vane defining a common wall between the two paths cooperates with a transversely disposed baffle member located upstream of a vane to direct a relatively small, substantially constant portion of the total input flow toward the main path, thereby permitting efficient liquid separation at the output of the main path. The remainder of the input flow is directed through the auxiliary path.

4 Claims, 1 Drawing Figure

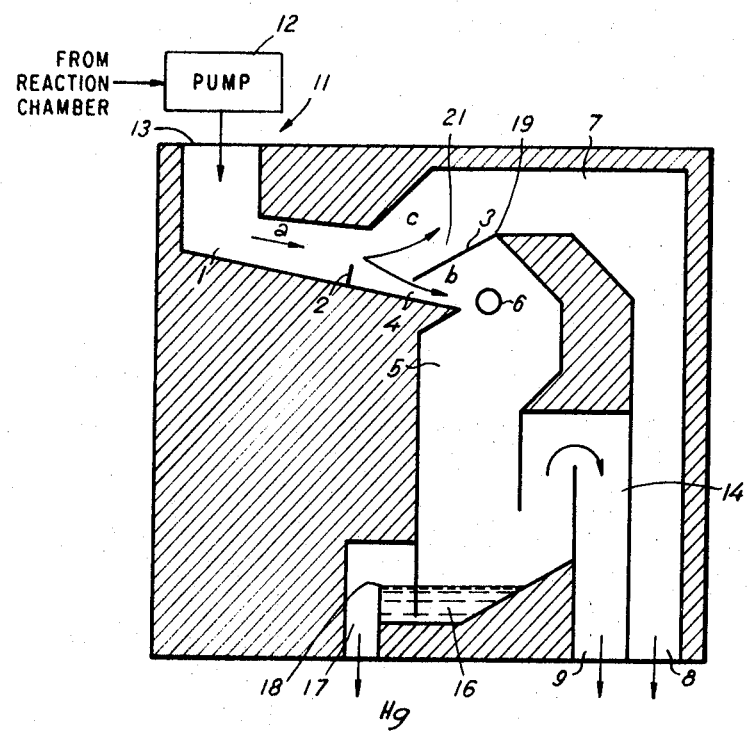

THROUGH-FLOW POLAROGRAPHIC ANALYZER HAVING CONSTANT FLOW FACILITIES

BACKGROUND OF THE INVENTION

Through-flow polarographic analyzers are advantageously used in the industrial measurement of a continuous liquid chemical reaction. Such analyzers typically measure selected parameters of an electrolyzed test liquid to obtain quantities from which suitable voltage-current response curves can be derived. The chemical reaction takes place in a chamber separate from the analyzer, and the test liquid product of the reaction is circulated via a suitable pump through the analyzer for measurement.

In general, when a test liquid is introduced into the measuring space (hereafter "first path" of the analyzer), an electrode situated in such first path drops mercury through the test liquid to electrolyze it, thereby facilitating the electrical sensing necessary to derive the required response curves.

While such separation of the reaction and measurement portions of the process greatly simplifies the arrangement and maintenance of the components employed in the analyzer, the use of this technique has in the past been subject to conflicting requirements. On the one hand, it has been found that for optimum results, the measurement of a portion of the test liquid in the analyzer should immediately follow the formation of such portion of the test liquid in the reaction chamber; that is, the transport lag in conveying the liquid from the reaction chamber to the analyzer should be minimal. This requirement necessitates a highly efficient pump which must be able to circulate the test liquid at a relatively large flow rate. At the same time, however, the flow of the test liquid within the first path of the analyzer should be relatively small, since the effective separation of the mercury from the test liquid becomes progressively more difficult as the liquid flow through the first path increases.

SUMMARY OF THE INVENTION

The arrangement of the present invention provides a technique for maintaining the test liquid flow through the first path at a relatively low value to effect efficient liquid separation at the output port of the analyzer, while at the same time permitting a relatively large flow between the analyzer and the reaction chamber to minimize transport lag.

In an illustrative embodiment, a second flow path separate from the first path extends between the input port and a second output port in the analyzer, with the first and second paths intersecting at a first junction. A common wall of the first and second paths is in the form of a vane extending from the junction toward the input port. The vane is oriented such that the opening between the input port and the first path is small relative to the opening between the input port and the second path, thereby to assure that the flow into the first path is low enough to efficiently permit separation of the test liquid from the mercury at the first output port. The remainder of the flow from the input port is directed into the second path.

In addition, to assure that incremental increases in the main input flow do not appreciably change the desired relatively small flow entering the first path, a baffle member is disposed transversely to the input flow between the input port and the vane to generally direct the test liquid toward the opening of the second path. This serves to channel an increasing portion of the incident test liquid into the second port as the flow rate of such test liquid increases.

The output port in the first path defines a main liquid closure which substantially prevents the outflow therethrough of mercury along with the test liquid after the required measurements in the first path take place. In order to further separate the mercury from the test liquid after measurement, a third output port may be provided to form a second liquid closure and to permit outflow of mercury after the residual separation.

BRIEF DESCRIPTION OF THE DRAWING

The invention will be further set forth in the following detailed description taken in conjunction with the appended drawing, in which the single FIGURE is a pictorial representation of a through-flow polarographic analyzer having facilities in accordance with the invention for maintaining a substantially constant flow in its main measuring path.

DETAILED DESCRIPTION

Referring to the drawing, the reference numeral 11 indicates a through-flow polarographic analyzer 11 having a main measuring path 5 for measuring specified characteristics of a test liquid introduced into such path. The test liquid is assumed to be formed in a continuous industrial reaction that takes place in a separate reaction chamber (not shown).

The test liquid is transported from the reactor to the analyzer by a suitable pump 12 at a rate that is selected in a conventional manner to yield a minimum transport lag between the reaction chamber and the analyzer. The test liquid enters the analyzer via an input port 13.

Within the main path 5 of the analyzer is a conventional electrode 6 which is arranged to drop mercury through the portion of the test liquid flowing in the main path 5. Such mercury effectively electrolyzes such test liquid to facilitate its electrical sensing (e.g., of pH, temperature, etc.), after which the measured liquid may be withdrawn from the path 5 through an output port 9.

The port 9 includes an overflow 14 and acts as a liquid closure which, when the flow rate through the main path 5 is relatively small, prevents substantial outflow through the port 9 of mercury that is dropped through the test liquid by the electrode 6. The test liquid exiting from the port 9 may then be recirculated back to the reaction chamber or further processed in any desired manner.

The mercury, which may be collected in a pool 16 at the bottom of the main path 5, may be further separated from any residual test liquid remaining in the main path by means of a second output port 17 which includes an overflow 18. The mercury exiting from the port 17 may be recirculated back to the electrode 6 or otherwise processed by conventional means.

The main flow of test liquid entering the input port 13, if allowed to enter the main path 5, would generally be too large to permit efficient separation of mercury and test liquid at the output ports 9 and 17. Unfortunately, any attempt under such circumstances to decrease the main flow into the input port 13 to make such liquid separation more efficient would have the undesirable effect of increasing the transport lag between the reaction chamber and the analyzer and would therefore delay the measurement in the analyzer of the successive samples of the test liquid formed in the reaction chamber.

In accordance with the invention, the analyzer 11 is further provided with an auxiliary path 7 that effectively shunts the main path 5. The auxiliary path extends from a common junction 19 with the main path 5 to a third output port 8. The junction 19 communicates with the input port 13 through a common channel 1.

With this arrangement, the input flow of test liquid from the reaction chamber first passes through the common channel 1 in the direction of an arrow $a$, and divides between the main path 5 and the auxiliary path 7 as indicated by arrows $b$ and $C$.

In order to assure that the portion of the input flow that enters the main path 5 remains at all times at the relatively low level necessary to assure efficient liquid separation at the output, the analyzer further includes a vane 3 which extends from the junction 19 into the common channel 1. The vane forms a common wall between the main path 5 and the auxiliary path 7, and establishes both a lower opening 4 between the channel 1 and the main path 5 and an upper opening 21 between the channel and the path 7. The vane 3 is oriented as shown so that the lower opening 4 is substantially smaller than the upper opening 21.

Additionally, a baffle member 2 is located in the channel 1 between the vane 3 and the input port 13. The baffle member extends transversely to the flow of test liquid in the channel 1 and is located close enough to the vane 3 such that liquid incident on the baffle member is deflected generally toward the upper opening 21 as shown.

With this arrangement, if the total input flow in the input port 13 increases by an incremental amount due, e.g., to changes in the viscosity in the test liquid, the deflection effect of the baffle member 2 will correspondingly increase and will therefore direct more of the test liquid through the auxiliary path 7. As a result, the increment in the total flow which, if permitted to enter the main path 5 would decrease the efficiency of liquid separation at its output, will be primarily taken up by the auxiliary path 7. In a typical case, it has been found that a 300% increase in the total flow at the input port 13 will yield less than a ten percent increase in the flow through the main channel 5.

The arrangement of the invention maintains the desired relatively small flow rate through the main path 5 with no moving parts or external closed-loop controls. The height and cross-sectional shape of the baffle member 2, the size of the relative openings 4 and 21 established by the vane 3, and the longitudinal distance between the vane and the baffle member may be adjusted to obtain an optimum flow through the main path 5.

In the foregoing, the invention has been described in connection with one preferred arrangement thereof. Many variations and modifications will now occur to those skilled in the art. It is accordingly desired that the scope of the appended claims not be limited to the specific disclosure herein contained.

What is claimed is:

1. In a polarographic analyzer having an input port into which a test liquid may be introduced, a first output port, and a first flow path between the input port and the first output port, an arrangement for maintaining the flow of the test liquid in the first path at a substantially constant level, which comprises:
    a second output port;
    means defining a second flow path between the input port and the second output port with the first and second paths intersecting at a first junction; and
    means for dividing the flow of test liquid entering the input port between the first and second paths such that incremental increases in the flow of the test liquid through the input port are directed into the second path.

2. An analyzer as defined in claim 1, in which the dividing means comprises, in combination, a vane defining a common wall of the first and second paths and extending from the junction toward the input port, the vane being oriented to establish a relatively small opening between the input port and the first path and a relatively large opening between the input port and the second path; and a baffle member located between the input port and the vane and disposed transversely to the flow of the test liquid for diverting such flow toward said relatively large opening.

3. An analyzer as defined in claim 2, in which the analyzer further comprises means for introducing mercury into the first path, and in which the first output port includes a first liquid closure for preventing the joint outflow therethrough of mercury and test liquid.

4. An analyzer as defined in claim 3, in which the analyzer further comprises a third output port including a second liquid closure for preventing the joint outflow therethrough of mercury and test liquid.

* * * * *